US006272153B1

(12) United States Patent
Huang et al.

(10) Patent No.: US 6,272,153 B1
(45) Date of Patent: Aug. 7, 2001

(54) DVD AUDIO DECODER HAVING A CENTRAL SYNC-CONTROLLER ARCHITECTURE

(75) Inventors: Wen Huang, Sunnyvale; Sophia Kao, Cupertino, both of CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/105,969

(22) Filed: Jun. 26, 1998

(51) Int. Cl.[7] ............................... H04J 3/06; H04L 13/10
(52) U.S. Cl. ...................... 370/503; 370/510; 370/506; 370/304
(58) Field of Search ................................... 370/209, 210, 370/503, 304, 510, 512, 506; 345/215, 328, 345, 354, 352; 348/462, 512, 515

(56) References Cited

U.S. PATENT DOCUMENTS

| 6,049,517 | * | 4/2000 | Tsutsui | 369/59 |
| 6,141,004 | * | 10/2000 | Jeong | 345/328 |
| 6,148,135 | * | 11/2000 | Suzuki | 386/12 |

* cited by examiner

Primary Examiner—Wellington Chin
Assistant Examiner—Brenda Pham
(74) Attorney, Agent, or Firm—Conley, Rose & Tayon; B. Noel Kivlin

(57) ABSTRACT

An audio decoder architecture makes use of various component sharing techniques to conserve hardware and reduce implementation cost. In one embodiment, the audio decoder comprises a bitstreamer, a synchronization controller, a first and second decode controllers, a memory module, a data path, and an output buffer. The bitstreamer retrieves compressed data and provides token-aligned data to the synchronization controller and decode controllers. The synchronization controller initially controls the bitstreamer to locate and parse audio frame headers to extract decoding parameters. The synchronization controller initiates the decode controller which corresponds to an identified compression format, and turns control of the bitstreamer and data path over to the selected decode controller. The selected decode controller then controls the bitstreamer to parse the variable length code compressed transform coefficients. The coefficients are passed to the memory module and data path which operate under the control of the selected decode controller to inverse transform the coefficients and produce digital output audio data. If the inverse transform is successfully completed, the selected decode controller asserts a decode done signal, and control returns uneventfully to the synchronization controller.

14 Claims, 5 Drawing Sheets

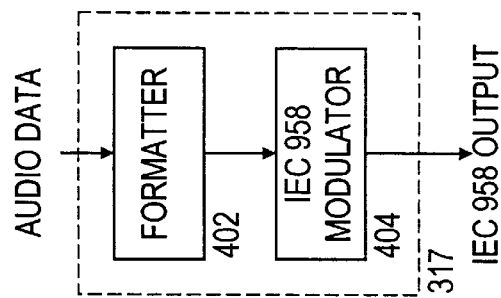
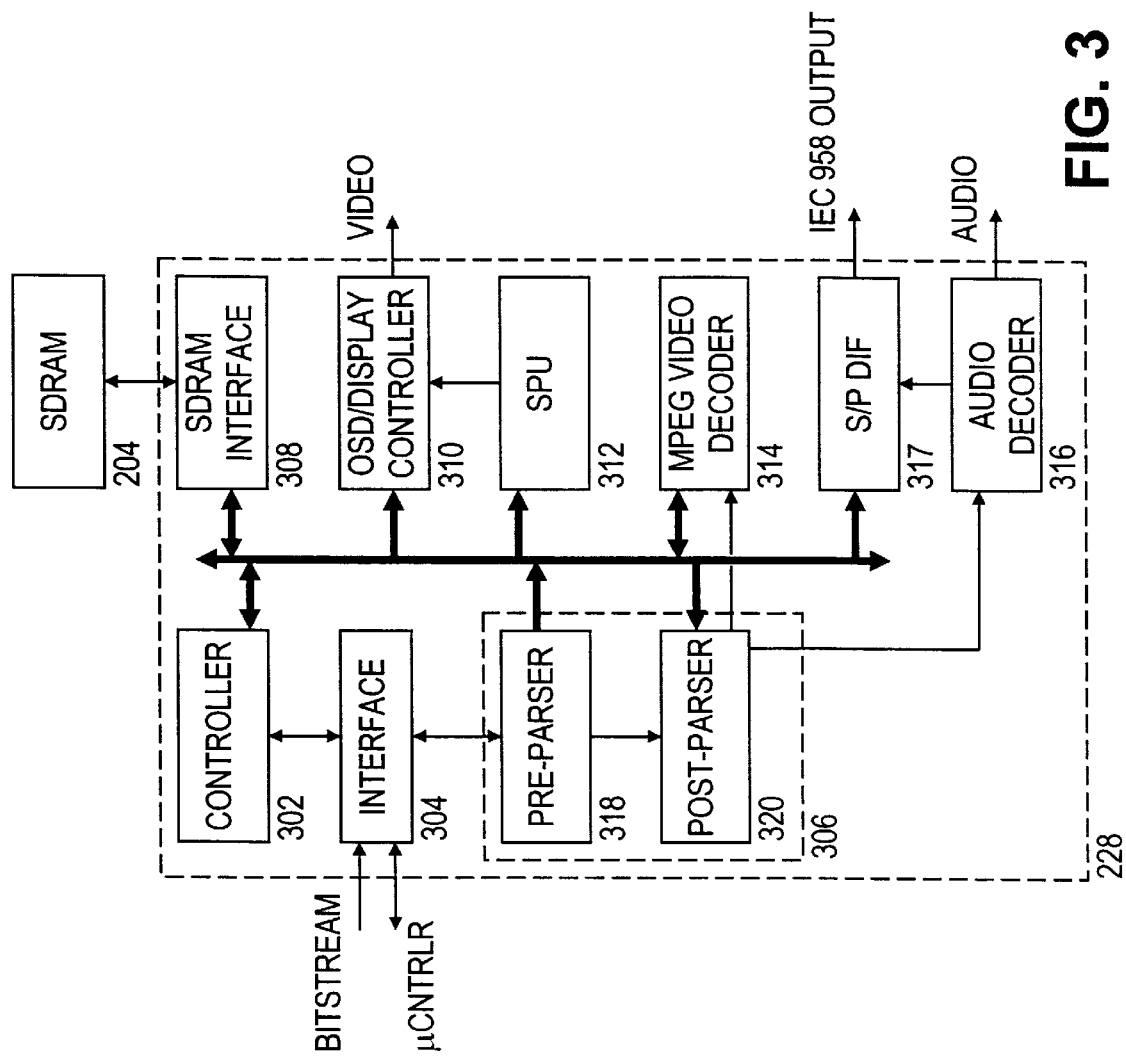

DVD AUDIO DECODER HAVING A CENTRAL SYNC-CONTROLLER ARCHITECTURE

RELATED APPLICATIONS

This application is related to U.S. patent application Ser. No. 09/105,490, now U.S. Pat. No. 6,098,044 (Atty Dkt #5201-18700) entitled "DVD Audio Decoder Having Efficient Deadlock Handling" by Wen Huang, and U.S. patent application Ser. No. 09/105,487, now U.S. Pat. No. 6,119,091 (Atty Dkt #5201-18800) entitled "DVD Audio Decoder Having A Direct Access PCM FIFO" by Wen Huang, Arvind Patwardhan, and Darren D. Neuman, both of which are filed concurrently herewith and incorporated by reference.

BACKGROUND OF THE INVENTION

1. Field of the Invention

This invention relates to the field of digital audio decoding, and in particular to a central synchronization-controller architecture for decoders which support more than one audio compression format.

2. Description of the Related Art

Digital audio and video programs in initial sampled form and final playback form comprise an enormous amount of data, indeed so much that it would be prohibitively expensive to store or to secure the necessary bandwidth and power to transmit programs of moderate quality and length. To address this problem, compression techniques are commonly employed to reduce the amount of data by which the program is represented during storage and transmission, after which the program is reconstructed by some matched decompression method. To ensure compliance between transmitters and receivers of various manufacturers, several compression standards have been established. For audio compression, MUSICAM and Dolby AC-3 are popular. For multimedia (audio/video) compression, MPEG and DVD are popular.

These standards are not completely distinct and independent, e.g. DVD employs MPEG video compression techniques and allows for use of MUSICAM and AC-3 audio compression techniques. Although attention herein is directed primarily to the DVD standard, much of what is said is also applicable to systems operating according to other compression standards, and exclusion of such systems is not intended.

A compressed bitstream created in accordance with the DVD standard consists of interleaved substreams. Examples of substreams which may be included in a DVD bitstream include audio substreams, a video substream, sub-picture unit (SPU) substreams, and navigation substreams. Each substream consists of data packets having a packet header and a packet payload. The packet header includes identifying information specifying which substream the packet belongs to and where it belongs in that substream. The packet header also includes information specifying the payload type and size, and any compression parameters which may be required for decompression.

To reconstruct the original data from the DVD bitstream, a DVD decoder locates the beginning of a packet, then reads the packet header to determine the substream membership. The decoder then routes the packet payload and portions of the packet header to the appropriate elementary bitstream buffer. Various modules of the decoder then operate on the contents of each buffer to reconstruct the associated program component (i.e. audio, video, SPU, navigation), and the reconstructed program component is finally presented to an appropriate output channel for delivery to the user.

As used herein, "substream" refers to the stream of data packets associated with a program component, and elementary bitstream refers to the data which is written to the elementary bitstream buffers, i.e. the contents of the data packet minus the identifying header fields, but including header fields which specie decompression parameters that may be needed by the ensuing decoder modules. Typically, audio data packets will be divided into audio data frames, with each frame having a frame header and a frame payload.

The DVD standard provides for three audio substream formats: linear pulse code modulation (LPCM), MPEG, and Dolby AC3. Hence, a multimedia decoder which is DVD compliant must support decoding of at least three different audio formats. Of the different audio formats, only one will be received at any given time. Therefore, to minimize decoder cost and avoid unnecessary duplication of hardware, it is desirable to devise a component sharing technique in which operations common to more than one format are carried out by a single component. Similar component sharing is also desirable between functional modules that normally do not operate simultaneously due to other considerations.

SUMMARY OF THE INVENTION

Accordingly, there is provided herein an audio decoder architecture that makes use of various component sharing techniques to conserve hardware and reduce implementation cost. In one embodiment, the audio decoder comprises a bitstreamer, a synchronization controller, a first and second decode controllers, a memory module, a data path, and an output buffer. The bitstreamer retrieves compressed data and provides token-aligned data to the synchronization controller and decode controllers. The synchronization controller initially controls the bitstreamer to locate and parse audio frame headers to extract decoding parameters. The synchronization controller then initiates the decode controller which corresponds to an identified compression format, and turns control of the bitstreamer and data path over to the selected decode controller. The selected decode controller then controls the bitstreamer to decode the variable length code compressed transform coefficients. The coefficients are passed to the memory module and data path which operate under the control of the selected decode controller to inverse transform the coefficients and produce digital output audio data. After the inverse transform is successfully completed, the selected decode controller asserts a decode done signal, and control returns uneventfully to the synchronization controller. The output buffer buffers the digital output audio data and asserts a underflow signal whenever the amount of buffered data falls below a predetermined threshold. The synchronization controller monitors this underflow signal while waiting for assertion of the decode done signal. If the underflow signal is asserted, the synchronization controller interprets it as evidence of a decoding process failure. The synchronization controller then seizes control of the bitstreamer, locates the next audio frame header, parses the header, re-initiates the appropriate decode controller, and returns control of the bitstreamer to the selected decode controller. The synchronization controller may also perform error handling functions including muting of the output audio signal. This hardware-saving architecture combines the parsing requirements for the different audio compression formats into a single, central synchronization controller, thereby providing for reduced hardware complexity and cost.

BRIEF DESCRIPTION OF THE DRAWINGS

Other objects and advantages of the invention will become apparent upon reading the following detailed description and upon reference to the accompanying drawings in which:

FIG. 3 shows a block diagram of a multimedia bitstream decoder;

FIG. 4 shows a block diagram of a Sony/Philips Digital Interface;

Figure 1:
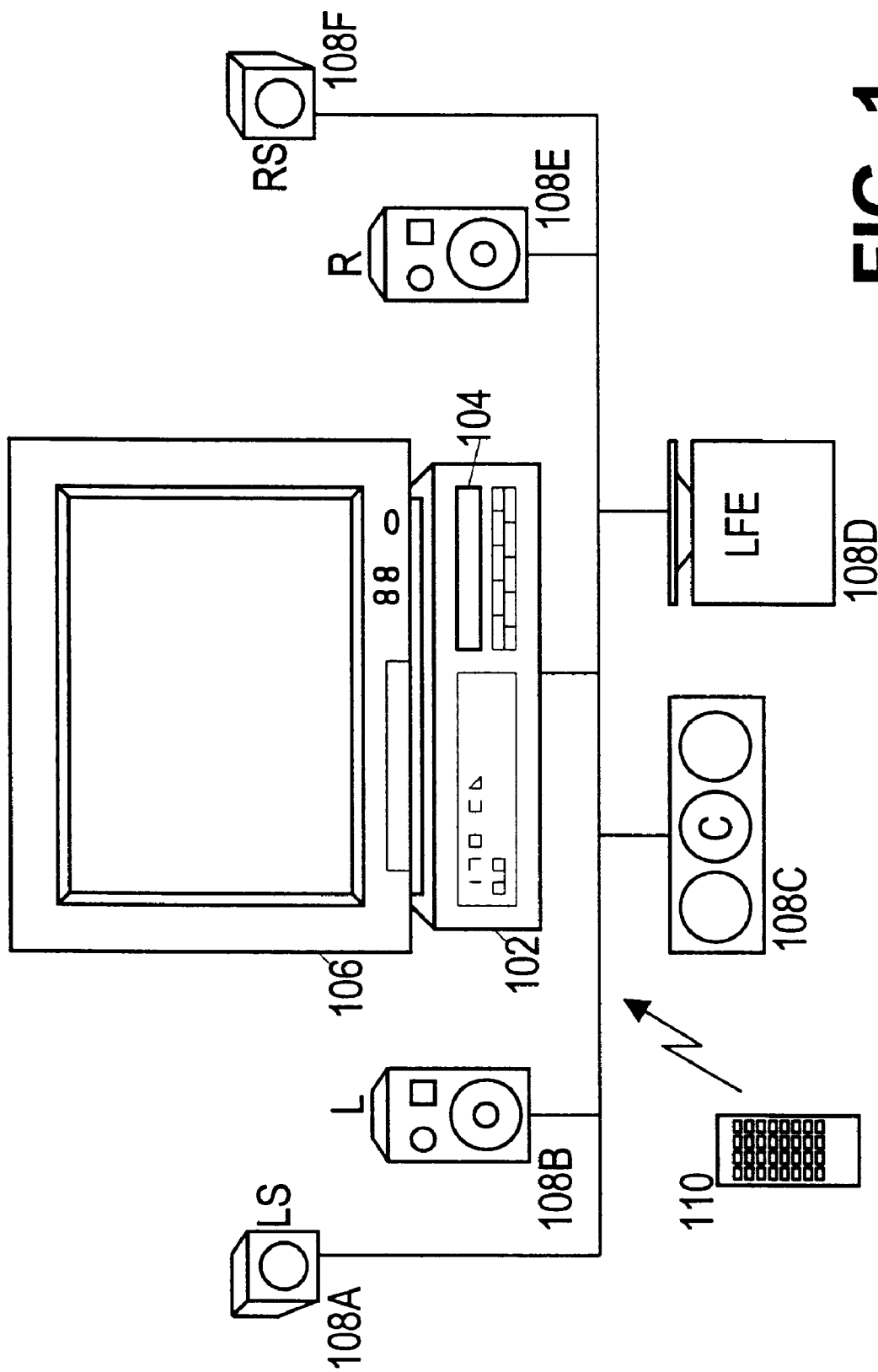
FIG. 1 shows a multimedia system which includes a multi-channel audio subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 shows a video playback device 102 that includes a multimedia disc drive 104, is coupled to a display monitor 106 and a set of speakers 108, and which may be controlled via a remote control 110. Video playback device 102 includes an audio decoder which advantageously uses an efficient method of deadlock prevention to allow time-shared access to shared components. The device 102 accepts multimedia discs in drive 104, and can read compressed multimedia bitstreams from the multimedia disc. The device 102 can convert the multimedia bitstreams into audio and video signals and present the video signal on display monitor 106 and the audio signals on speaker set 108.

In one embodiment, multimedia drive 104 is configured to accept a variety of optically readable disks. For example, audio compact disks, CD-ROMs, DVD disks, and DVD-RAM disks may be accepted. The drive 104 can consequently read audio programs and multimedia bitstreams. The drive 104 may also be configured to write multimedia bitstreams, and may additionally be configured to write audio programs. The drive 104 includes a multimedia decoder which converts read multimedia bitstreams into video displays and audio programs. The drive 104 may also include a multimedia encoder for converting video displays and audio programs into a multimedia bitstream. A user can instruct the device 102 to forward any received video displays and audio programs directly to the display monitor 106 and speaker set 108 for display and audio playback.

Figure 2:
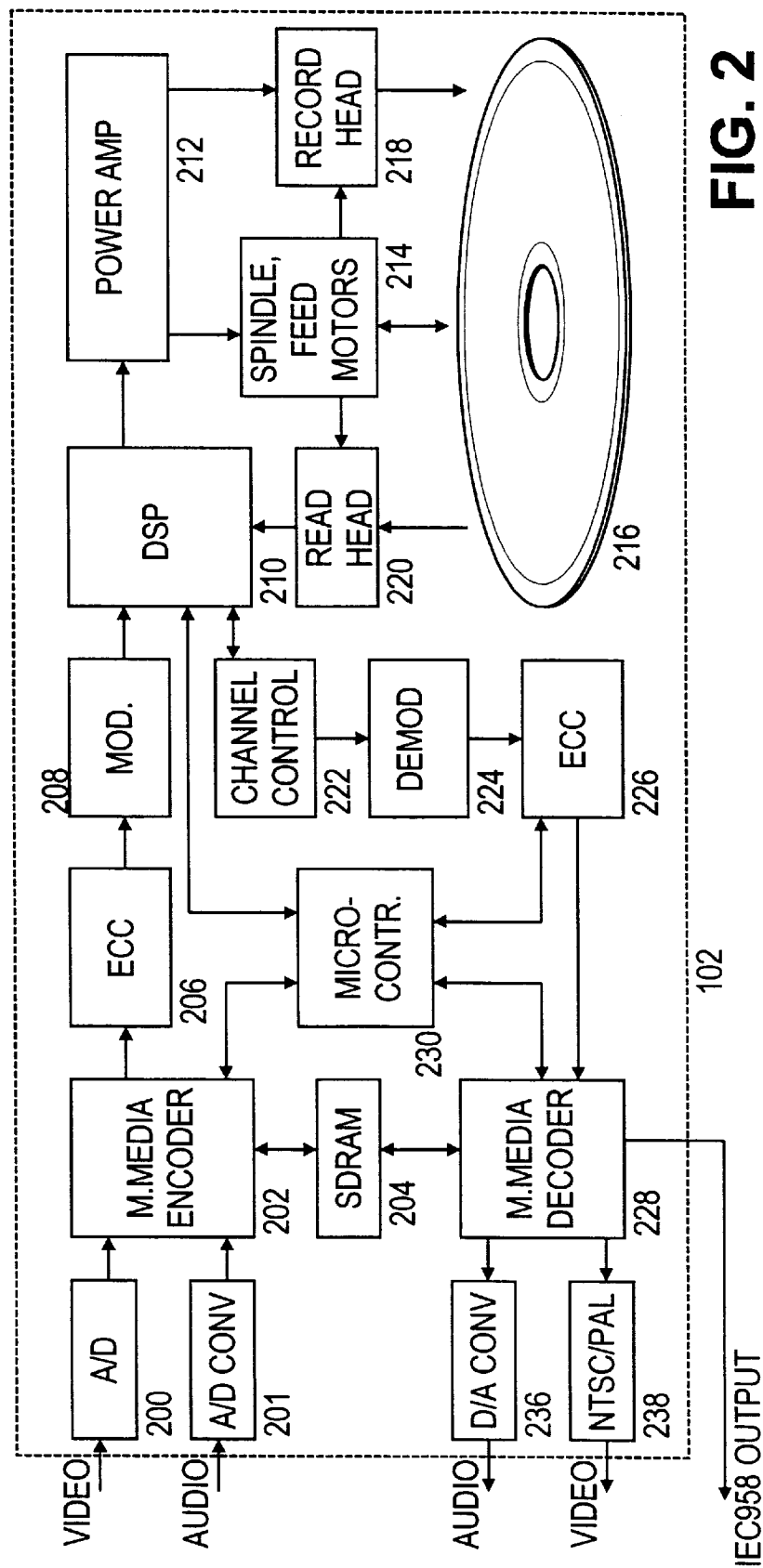
FIG. 2 shows a functional block diagram of a multimedia recording and playback device.

Turning now to FIG. 2, a functional block diagram of one embodiment of a video recording and playback device 102 is shown. The device 102 provides audio and video signals to the display monitor 106, and may provide an IEC958-compliant digital audio bitstream to an external component. The device 102 can also accept audio and video signals from a television tuner or some other source. The received video and audio signals are converted to digital video and audio signals by A/D converters 200, 201. The digital audio and video bitstreams are provided to multimedia encoder 202. Multimedia encoder 202 uses synchronous dynamic random access memory (SDRAM) 204 as a frame store buffer while encoding the received signals. The resulting multimedia bitstream is processed by an error correction encoder 206 then converted to a modulated digital signal by modulator 208. The modulated digital signal is coupled to a digital signal processor (DSP) 210 and from there to a power amplifier 212. Amplified signals are coupled to drive motors 214 to spin a recordable multimedia disk 216, and to a record head 218 to store the modulated digital signal on the recordable multimedia disk 216.

Stored data can be read from the recordable multimedia disk 216 by read head 220 which sends a read signal to DSP 210 for filtering. The filtered signal is coupled to channel control buffer 222 for rate control, then demodulated by demodulator 224. An error correction code decoder 226 converts the demodulated signal into a multimedia bitstream which is then decoded by multimedia decoder 228. In decoding the multimedia bitstream, he multimedia decoder 228 produces digital audio and video bitstreams which are provided to D/A converters 236 and 238, which in turn provide the audio and video signals to display monitor 106. Video D/A 238 is typically an NTSC/PAL rasterizer for television, but may also be a RAMDAC for other types of video screens. Some of the various components are now described in greater detail.

Multimedia encoder 202 operates to provide compression of the digital audio and video signals. The digital signals are compressed individually to form bitstreams which are then divided into packets which are inter-mixed to form the compressed multimedia bitstream. Various compression schemes may be used, including MPEG and DVD.

In one embodiment, the general nature of the video compression performed by multimedia encoder 202 is MPEG encoding. The video compression may include sub-sampling of the luminance and chrominance signals, conversion to a different resolution, determination of frame compression types, compression of the frames, and re-ordering of the frame sequence. The frame compression may be intraframe compression or interframe compression. The intraframe compression is performed using a block discrete cosine transform with zigzag reordering of transform coefficients followed by run length and Huffman encoding of the transform coefficients. The interframe compression is performed by additionally using motion estimation, predictive coding, and coefficient quantization.

In one embodiment, the general nature of the audio compression performed by multimedia encoder 202 is MPEG-2/AC-3 encoding. The audio compression may include locking the input sampling rate to the output bit rate, sample rate conversion, input filtering, transient detection, windowing, time-to-frequency domain transformation, channel coupling, rematrixing, exponent extraction, dithering, encoding of exponents, mantissa normalization, bit allocation, quantization of mantissas, and packing of audio frames, e.g. for AC-3 encoding. Similarly, the audio compression may include filter bank synthesis, calculation of signal to noise ratio, bit or noise allocation for audio samples, scale factor calculation, sample quantization, and formatting of the output bitstream, e.g. for MPEG-2 encoding. For either method, the audio compression may further include subsampling of low frequency signals, adaptation of frequency selectivity, and error correction coding.

In another embodiment, audio compression may not be employed, and the audio channels may be formatted as a linear pulse-code modulation (linear PCM) bitstream. In this form, the audio signals are sampled at 48 or 96 kHz and the samples are packed into audio data frames and provided with a packet header to form audio substream packets.

Error correction encoder 206 and modulator 208 operate to provide channel coding and modulation for the output of the multimedia encoder 202. Error correction encoder 206 may be a Reed-Solomon block code encoder, which provides protection against errors in the read signal. The modulator 208 converts the error correction coded output into a modulated signal suitable for recording on multimedia disk 216.

DSP 210 serves multiple functions. It provides filtering operations for write and read signals, and it acts as a controller for the read/write components of the system. The modulated signal provided by modulator 208 provides an "ideal" which the read signal should approximate. In order to most closely approximate this ideal, certain nonlinear characteristics of the recording process must often be compensated. The DSP 210 may accomplish this compensation by pre-processing the modulated signal and/or post-processing the read signal. The DSP 210 controls the drive motors 214 and the record head 218 via the power amplifier 212 to record the modulated signal on the multimedia disk 216. The DSP 210 also controls the drive motors 214 and uses the read head 220 to scan the multimedia disk 216 and produce a read signal.

The channel control buffer 222 provides buffering of the read signal, while demodulator 224 demodulates the read signal and error correction code decoder 226 decodes the demodulated signal. After decoding the demodulated signal, the error correction decoder 226 forwards the decoded signal to multimedia decoder 228.

Multimedia decoder 228 operates to decode the output of the error correction decoder 226 to produce digital audio signal and video signal, as well as an IEC958-formatted audio bitstream. The operation and structure of multimedia decoder 228 are discussed further below. The digital audio signal and video signal may be converted to analog audio and video signals before being sent to display monitor 106. The IEC958 bitstream may be provided directly to an external audio component.

Turning now to FIG. 3, a block diagram of one embodiment of multimedia decoder 228 is shown. Multimedia decoder 228 comprises a controller 302, a host interface 304, a variable length decoder (VLD) 306, a memory interface 308, a display controller 310, a sub-picture unit (SPU) 312, an MPEG video decoder 314, an audio decoder 316, and a Sony/Philips Digital Interface (S/P DIF) 317. VLD 306 includes a pre-parser 318 and a post-parser 320. Controller 302 is coupled to the rest of the modules of multimedia decoder 228 to configure their behavior by setting various configuration registers and to monitor their performance. Controller 302 may also transmit status and request information to an external microcontroller 230. Host interface 304 is coupled to controller 302 and VLD 306, and is configured to receive an encoded multimedia bitstream and to communicate with an external microcontroller 230. Various operating instructions (e.g. reset, begin decode, playback mode) may be provided by external microcontroller 230 to controller 302 via host interface 304. Other operating instructions may be found in the encoded multimedia bitstream and provided to controller 302 (e.g. navigation commands).

VLD decoder 306 receives the encoded multimedia bitstream from host interface 304 and parses the encoded multimedia bitstream. Pre-parser 318 determines the substream membership of each data packet from the packet header and routes the packet contents (minus identifying fields from the packet header) to the appropriate elementary bitstream buffer in memory 204, where they wait on the availability of the associated module to begin being processed. Certain data packets (e.g. SPU substream, navigation substream) are retrieved directly from the appropriate buffer in memory 204 by the associated module. However, many of these data packets may have variable-length encoded data (e.g. compressed audio and video). These data packets are passed to the associated module via post-parser 320. Post-parser 320 may parse the bitstream syntax and perform elementary operations such as extracting the bit allocation and scaling information from the headers, and applying that information to convert the variable-length encoded data into fixed-length transform coefficients for subsequent modules to process.

Memory interface 308 acts as a bus arbiter and provides access to memory 204 for the other modules. Display controller 310 retrieves decoded digital video data from a buffer in memory 204 and provides it in raster order as a digital video output. Display controller 310 may incorporate an on-screen display (OSD) unit that can overlay system information on the video image, e.g. configuration menus, time, channel volume, etc. Display controller 310 may also be coupled to overlay bitmap signals from other modules onto the video image. SPU controller 312 retrieves bitstream information from an SPU buffer in memory 204, decodes it into bitmap information, and provides the resulting bitmap to display controller 310 for possible display.

Video decoder 314 receives variable-length decoded transform coefficients from post-parser 320 and decodes them to generate decoded video data. The decoding process typically involves reference to anchor frames stored in frame buffers in memory 204. Video decoder 314 retrieves anchor frame data from the frame buffers and writes the decoded video data to anchor frame buffers or to intermediate buffers from which it is retrieved by display controller 310 for display.

Audio decoder 316 receives audio data from post-parser 320. Audio decoder 316 is configurable to parse the audio bitstream side information (BSI) from header fields and to convert transform coefficients into digital audio samples, and is further configurable to re-assemble LPCM audio data into digital audio samples.

S/P DIF 317 may be configured to retrieve audio data directly from the elementary audio bitstream buffer in memory 204, or may also be configured to receive audio data from audio decoder 316 and tracks the location of the next byte to be retrieved using an audio bypass buffer pointer. S/P DIF 317 formats the data into subframes, and transmits the formatted data to any external interface coupled to receive the IEC958 bitstream. The S/P DIF 317 is configured to maintain a loose synchronization with the audio decoder 316 to avoid introducing any undesired delays between reproduced audio signals.

FIG. 4 shows one embodiment of S/P DIF 317. S/P DIF 317 includes a data formatter 402 and an IEC 958 modulator 404. Formatter 402 is configured to format the received audio data into subframes for the modulator 404 to transmit. Modulator 404 is configured to convert subframes from formatter 402 into a serial, bi-phase coded, analog channel signal in accordance with the IEC 958 standard (IEC 958 First edition 1989-03: Digital audio interface) which is hereby incorporated by reference. Modulator 404 may include a input buffer for subframes provided from formatter 402.

The behavior of formatter 402 is dependent on the format of the received audio data. For compressed audio data, such as MPEG or AC3, a synchronization field is included at the beginning of each audio frame in the elementary bitstream buffer. The formatter 402 begins operation by locating this synchronization word. The formatter 402 then prepends four 16-bit words to the audio frame and appends zeros as necessary to provide the audio frame with a pre-determined length. The prepended words are denoted (in order) Pa, Pb, Pc, Pd. Pa and Pb are synchronization words, Pc identifies the compression standard for the audio frame, and Pd indicates the audio frame size. The enhanced audio frame is then taken 16 bits at a time and formatted into 32-bit subframes. The subframes each consist of a 4-bit synchronization preamble, four auxiliary bits, four zeros, 16 audio frame bits, and four subframe bits. The four subframe bits are validity (V), user (U), control (C) and parity (P). The use and meaning of the subframe components is described further in the IEC 958 standard and the DVD standard.

For linear PCM audio data with 20- or 24-bit audio sample resolution, the formatter 402 reconstructs the audio samples from the audio frames in the bitstream buffer by appending nibbles or bytes to the most significant 16 bits. This is unnecessary for linear PCM audio frames with 16-bit sample resolutions or less, or for LPCM data being provided from the audio decoder 418. The audio samples may then be multiplied by a gain factor if the gain control is enabled. The formatter 402 then takes audio samples and formats them into 32-bit subframes consisting of a 4-bit synchronization preamble, the audio sample (zero extended in the least significant bits to 24 bits), and four subframe bits.

Figure 5:
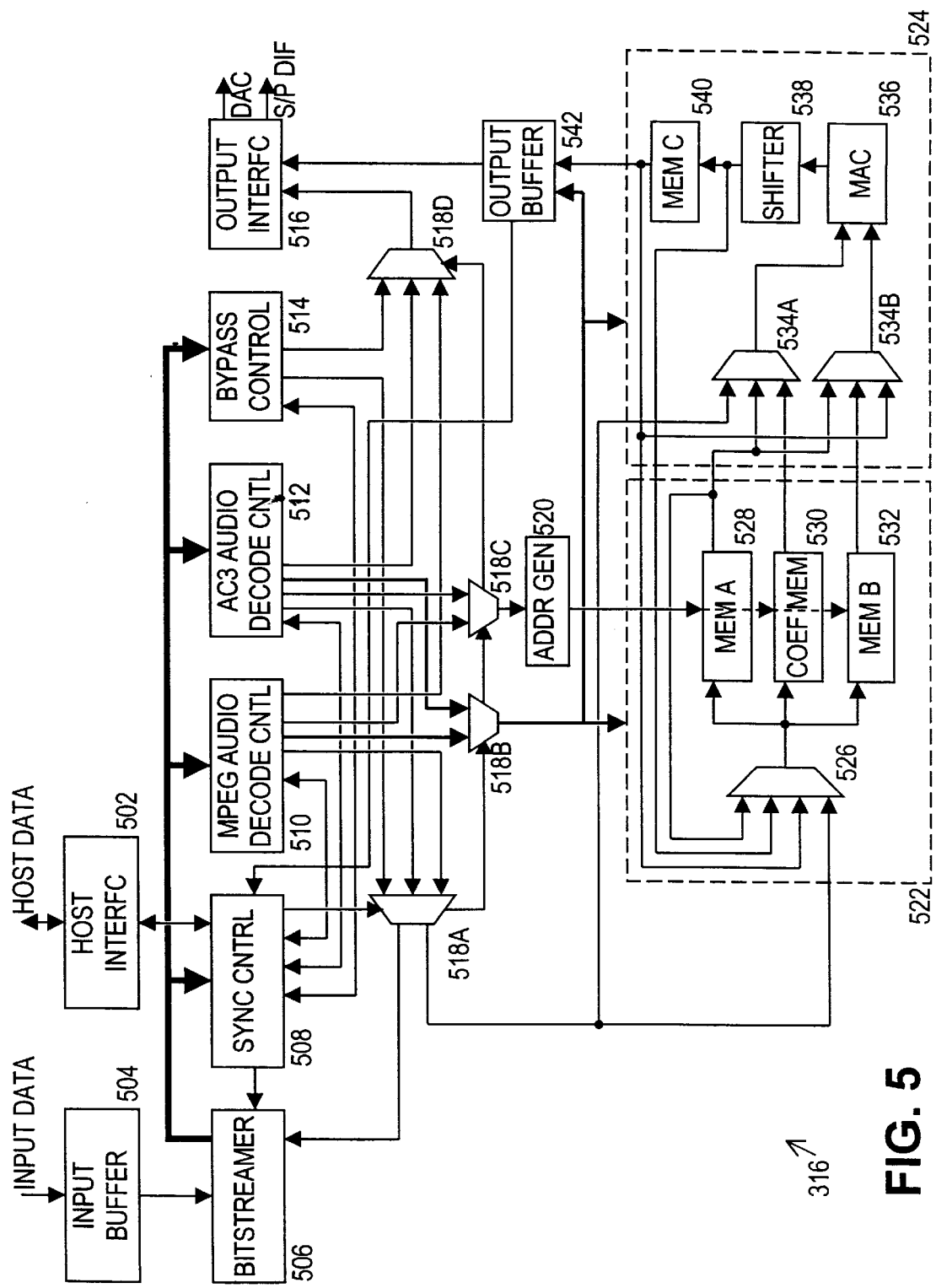
FIG. 5 shows a block diagram of an audio decoder.

FIG. 5 shows one embodiment of audio decoder 316 which implements component sharing techniques. The audio decoder 316 comprises a host interface 502, an input buffer 504, a bitstream 506, a synchronization controller 508, an MPEG audio decode controller 510, an AC3 audio decode controller 512, a bypass controller 514, an output interface 516, a set of controller multiplexers 518, an address generator 520, a memory module 522, a data path module 524, and an output buffer 542. The memory module 522 includes an input multiplexer 526, a first intermediate memory 528, a coefficient memory 530, and a second intermediate memory 532. The data path module includes input multiplexer pair 534, multiplier/accumulator 536, shifter 538, and output memory 540.

The host interface 502 couples to controller 302 to allow controller 302 to read and write status and configuration information to registers in sync controller 508. The input buffer 504 is coupled to post-parser 320 to receive audio data from the elementary audio bitstream buffer in memory 204. Since the header fields have varying sizes and the audio data may be variable-length encoded, the retrieval of information from buffer 504 is handled by bitstreamer 506. Bitstreamer 506 retrieves whole bytes from buffer 504 and provides whole shifted bytes as output to one of the controllers 508, 510, 512, 514. The shifted bytes are bit-shifted versions of the retrieved information from buffer 504; the shift amount is determined by an accumulation of token lengths as determined by the controllers. Bitstreamer 506 includes a concatenation register for concatenating adjacent bytes from buffer 504, and a shifter for shifting the concatenated bytes to determine a shifted byte. One of the controllers 508, 510, 512, 514 examines the shifted byte, identifies a token meaning and token size, and provides the token size to the bitstreamer 506 to allow the shifter to adjust the shift amount and provide the next byte of shifted information.

Sync controller 508 implements a state machine for parsing the audio data frame headers and extracting bitstream side information (BSI) such as audio data format, bit rate, and sampling frequency. The extracted BSI is used to set configuration registers that are used by whichever controller 510, 512, 514 is used to handle the audio data in the audio data frame. The state machine implemented by sync controller 508 is written to accommodate the variations in header field format due to the various supported audio data formats. At the beginning of each audio data frame, the sync controller 508 is in control of the bitstreamer 506, and after the sync controller 508 finishes parsing the header information, it passes control of the bitstreamer 506 to a selected controller 510, 512, 514.

MPEG audio decode controller 510 and AC3 audio decode controller 512 each implement a state machine which carries out decoding of audio data compressed according to the corresponding standard. Bypass controller 514 operates to bypass the decoding process and to forward the information more-or-less directly from the bitstreamer 506 to the output buffer 542. A set of multiplexers 518 is controlled by sync controller 508 to determine which of the controllers 510, 512, 514 controls the processing of the audio data after any header fields have been parsed. Bitstreamer 506 control signals, data path input signals, and output interface control signals 516 are provided from each of the three controllers, and multiplexers 518A, 518D route the selected controllers signals to the associated components. Additionally, controllers 510, 512 provide memory module 522 and data path 524 control signals, and address generator 520 signals, and multiplexers 518B and 518C route the selected signals to the appropriate components.

Controllers 510, 512, and 514 determine a token size and meaning for each byte received from bitstreamer 506, and via multiplexer 518A, the selected controller provides the token meaning to memory module 522 and data path 524. According to control signals provided from the selected controller via multiplexer 518B, the memory module 522 and data path 524 operate to process the input values from multiplexer 518A. Ultimately in response to the control signals from the selected controller, data path 524 determines a sequence of digital output audio samples which are provided to output buffer 542, from which they are retrieved by output interface 516 and provided to a digital-to-analog converter (DAC) and/or S/P DIF 317.

Input multiplexer 526 steers data from various input sources to intermediate memories 528, 532 and to a read-only memory 530. The input sources include multiplexer 518A, one of the intermediate memories 528, and data path 524. The control signals from multiplexer 518B determine which input source is selected, which memory is triggered to receive the input data, and which memories are configured to provide read data to data path 524. The memories 528, 530, 532 are configured to receive addresses from address generator 520 for storing input data or reading stored data. Read-only memory 530 may also be configured to use the input data as a read address. Address generator 520 may include a look-up table, counter, and/or additional logic to simplify the implementation of the state machines in controllers 510, 512 for carrying out the decoding algorithms.

Data path 524 includes a multiplexer pair 534A, 534B for selecting input factors to multiplier/accumulator 536. The selected input factor from multiplexer 534A may be from multiplexer 518A, intermediate memory 528, or coefficient memory 530. The selected input factor from multiplexer 536B may be from either of the intermediate memories 528, 532, or from the output of data path 524. The factors are multiplied by multiplier/accumulator 536 and a sequence of products may be summed in accordance with control signals from multiplexer 518B. The output of multiplier/ accumulator 536 may be shifted 538 and buffered in intermediate buffer 540, again in accordance with the control signals. The configuration of address generator 520, memory module 522, and data path 524 provides for the ability to carry out a wide variety of algorithms in one or more ways. The state machines implemented in controllers 510, 512, 514 provide the control signals necessary to direct the execution of the algorithms to produce decoded audio sample sequences and buffer them in output buffer 542. Output interface 516 receives a sample-request clock and responsively retrieves and provides digital audio samples from the output buffer. In one embodiment, the output samples are provided simultaneously to both the DAC and the S/P DIF.

Output buffer 542 is a first-in first-out (FIFO) buffer with a buffer status signal. In one embodiment, the buffer status signal is asserted when the output buffer is empty. In another embodiment, the buffer status signal is asserted when the output buffer holds less than 1 milliseconds worth of data. In yet another embodiment, the buffer status signal is asserted when the output buffer holds less than enough data for 32 sampling-time instants. The buffer status signal is coupled to the synchronization control 508.

It is noted that in the described embodiment of audio decoder 316, the synchronization controller 508 is shared in common between the MPEG decode controller 510 and the AC3 decode controller 512, to implement the initial parsing of audio frame headers for the different decoding modes. It is also noted that the synchronization controller 508 timeshares control of the bitstreamer 506 with one of the selected controllers 510, 512, 514. It has been previously noted that due to some corruption of the bitstream or error in the decoding process (e.g. an overflow error in the multiplier/ accumulator 536) the bitstreamer 506 may not be released in a timely fashion and system deadlock may result. Because of its central role in the decoder implementation, the synchronization controller 508 is charged with control of the bitstreamer 506 and is further provided with error control capabilities. As discussed further below, the synchronization controller 508 implements an efficient deadlock-prevention technique.

Figure 6:
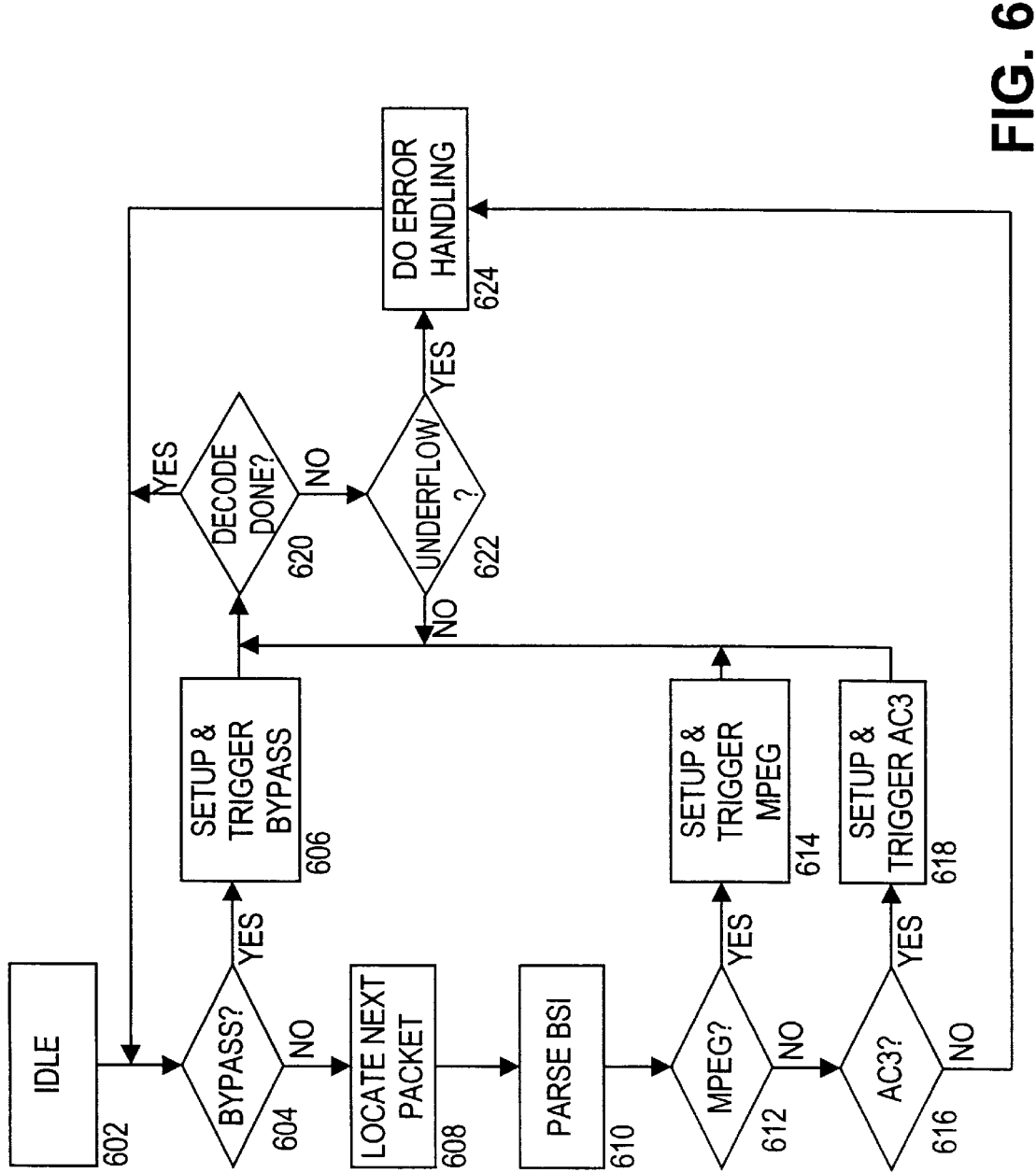
FIG. 6 shows a flow diagram which may be implemented by a synchronization controller.

FIG. 6 shows a flow control diagram implemented by one embodiment of synchronization controller 508. The synchronization controller 508 initially begins in an idle state 602, and may return there upon the assertion of a system-reset signal. Upon receipt of audio data in input buffer 504, sync controller 508 exits the idle state 602 and performs a test 604 to determine if the bypass mode has been set in the configuration registers. If so, the sync controller 508 initializes 606 the bypass controller 514 and sets multiplexers 518 to allow the bypass controller 514 to operate the bitstreamer 506, the output interface 516, and the other decoder components. The sync controller may then pause for a short time before entering the monitoring loop 620, 622.

If the bypass mode has not been set, the sync controller 508 locates 608 the beginning of the next audio frame by searching for a synchronization field. After locating 608 the beginning of the next audio frame, the sync controller 508 parses 610 the frame header to extract the BSI. The BSI is used to update the configuration registers with the decompression parameters and compression mode. The sync controller then tests 612 to determine if the audio data is MPEG encoded, and if so, it initializes 614 and turns control over to the MPEG decode controller 510. After a short pause, the sync controller may then enter the monitoring loop 620, 622.

If the MPEG mode has not been set, the sync controller 508 tests 616 to determine if the audio data is AC3 encoded, and if so, it initializes 618 and turns control over to the AC3 decode controller 512. After a short pause, the sync controller may then enter the monitoring loop 620, 622. If the data is neither MPEG or AC3 encoded, the sync controller performs some error handling 624, which may include muting the audio output and sending an error message to controller 302.

In the monitoring loop, sync controller 508 checks 620 to determine if a decode done signal has been asserted by the selected controller 510, 512, 514. If not, then the sync controller checks 622 to determine if the buffer status signal has been asserted by output buffer 542 to indicate a buffer underflow. If not, then the sync controller loops indefinitely, repeatedly checking 620, 622. If the underflow check 622 is ever affirmative, then the sync controller performs error handling 624 before returning to the initial test 604. If the decode done test 620 is ever affirmative, the sync controller 508 returns directly to the initial test 604. Upon exiting the monitoring loop, sync controller 508 retrieves control of bitstreamer 506.

It is noted that since any failure in the decoding process will result in an underflow of output buffer 542, the implementation of monitoring loop 620,622 advantageously provides an efficient method for preventing deadlock. The occurrence of a decoding error may produce a glitch in the output audio, but the decoding process will continue at the beginning of the next audio frame.

Numerous variations and modifications will become apparent to those skilled in the: art once the above disclosure is fully appreciated. It is intended that the following claims be interpreted to embrace all such variations and modifications.

What is claimed is:

1. An audio decoder which comprises:
   a synchronization controller configured to retrieve input audio data and configured to locate an audio frame header, wherein the synchronization controller is further configured to parse the audio frame header and identify an audio compression format for the audio frame;
   a first decode controller configured to be triggered by the synchronization controller, wherein if the first decode controller is triggered, the first decode controller is configured to retrieve audio data from an audio frame having a first compression format and to convert the retrieved audio data into decompressed transform coefficients;
   a second decode controller configured to be triggered by the synchronization controller, wherein if the second decode controller is triggered, the second decode controller is configured to retrieve audio data from an audio frame having a second compression format and to convert the retrieved audio data into decompressed transform coefficients; and
   a data path coupled to the first and second controllers to receive the decompressed transform coefficients, wherein the data path is configured to operate on the decompressed transform coefficients in response to control signals from a triggered decode controller to produce a sequence of digital output audio samples,
   wherein the first and second decode controllers are each configured to direct the data path to carry out an inverse transform algorithm for the first and second compression formats, respectively, wherein the first and second decode controllers are each configured to assert a decode done signal after completion of the inverse transform algorithm, and wherein the synchronization controller is configured to detect the decode done signal assertion and responsively locate a next audio frame header, wherein the synchronization controller is further configured to parse the next audio frame header to identify an audio compression format and responsively trigger a corresponding decode controller.

2. The audio decoder of claim 1, wherein the synchronization controller includes configuration registers for providing decoding parameters to the first and second decode controllers, and wherein the synchronization controller extracts the decoding parameters while parsing the audio frame header and updates the configuration registers accordingly.

3. The audio decoder of claim 2, further comprising a host interface coupled to the synchronization controller to read from and write to the configuration registers in response to communications from a host microcontroller.

4. The audio decoder of claim 1, further comprising a bitstreamer coupled to an input buffer to retrieve input audio data and configured to concatenate and shift bytes of input audio data in response to token-size signals to produce token-aligned data, wherein the synchronization controller is configured to provide the token-size signals and receive the token-aligned data when locating an audio frame header.

5. The audio decoder of claim 4, wherein after parsing the audio frame header, the synchronization controller configures the bitstreamer to provide token-aligned data to the triggered decode controller in response to token-size signals from the triggered decode controller.

6. The audio decoder of claim 1, further comprising an output buffer configured to buffer the sequence of digital output audio samples from the data path and further configured to assert an underflow signal if the output buffer contains less than a predetermined number of digital output audio samples.

7. The audio decoder of claim 6, wherein the synchronization controller is configured to detect an assertion of the underflow signal and responsively interrupt the triggered controller and locate the next audio frame header.

8. The audio decoder of claim 1, wherein the synchronization controller searches for a synchronization word to locate the audio frame header.

9. A hardware-saving architecture for an audio decoder, wherein the architecture comprises:

a bitstreamer configured to receive compressed audio data and configured to concatenate and shift adjacent bytes of the compressed audio data in response to token-size signals to produce token-aligned data;

a synchronizer coupled to the bitstreamer to provide the token-size signals and receive the token-aligned data, wherein the synchronizer is configured to locate and parse audio frame headers to extract decoding parameters and identify a compression format;

a first decode controller coupled to the bitstreamer to provide the token-size signals and receive the token-aligned data, wherein if the identified compression format is a first compression format, the first decode controller is configured to convert the token-aligned data into decompressed coefficients and to provide control signals for carrying out an inverse transformation algorithm for converting the coefficients into digital output audio samples;

a second decode controller coupled to the bitstreamer to provide the token-size signals and receive the token-aligned data, wherein if the identified compression format is a second compression format, the second decode controller is configured to convert the token-aligned data into decompressed coefficients and to provide control signals for carrying out an inverse transformation algorithm for converting the coefficients into digital output audio samples;

a data path module coupled to the first and second decode controllers to receive the decompressed coefficients and control signals and configured to responsively carry out an inverse transformation algorithm for converting the decompressed coefficients into digital audio samples, wherein the synchronizer is configured to initiate a selected decode controller that corresponds to the identified compression format and to configure the bitstreamer and data path to operate under control of the selected decode controller.

10. The hardware-saving architecture of claim 9, wherein the synchronizer includes configuration registers for storing the extracted decoding parameters, and wherein the selected decode controller is configured to retrieve the extracted decoding parameters from the configuration registers as needed.

11. The hardware-saving architecture of claim 9, wherein the first and second decode controllers are each configured to assert a decode done signal after completion of the inverse transformation algorithm, and wherein the synchronization controller is configured to recover control of the bitstreamer and to locate a next audio frame header.

12. The hardware-saving architecture of claim 9, further comprising an output buffer configured to buffer the digital output audio samples produced by the data path module and configured to assert an underflow signal when the output buffer holds fewer than a predetermined number of digital output audio samples.

13. The hardware-saving architecture of claim 12, wherein the synchronizer is further configured to interrupt the selected decode controller and assert a mute signal if the underflow signal is asserted later than a predetermined delay after initiating the selected decode controller.

14. The hardware-saving architecture of claim 12, wherein the synchronizer is further configured to seize control of the bitstreamer if the underflow signal is asserted later than a predetermined delay after initiating the selected decode controller, and thereafter configured to locate and parse a next frame header.

* * * * *